(12) United States Patent
Neuerburg et al.

(10) Patent No.: US 6,349,529 B1
(45) Date of Patent: Feb. 26, 2002

(54) OPERATING DEVICE FOR AN AGRICULTURAL MACHINE

(75) Inventors: Horst Neuerburg; Fernand Kieffer, both of Saverne (FR)

(73) Assignee: Kuhn, S.A., Saverne Cedex (FR)

(*) Notice: Subject to any disclaimer, the term of this patent is extended or adjusted under 35 U.S.C. 154(b) by 0 days.

(21) Appl. No.: 09/081,285

(22) Filed: May 20, 1998

(30) Foreign Application Priority Data

May 26, 1997 (FR) .............................................. 97 06563

(51) Int. Cl.⁷ .............................................. A01D 34/66
(52) U.S. Cl. ................... 56/14.9; 56/6; 56/15.2
(58) Field of Search ........................ 56/6, 7, 13.5, 14.9, 56/15.2, 15.7, 15.8, 15.9, 15.1, 15.3, 17.4, 320.1, 320.2, DIG. 20

(56) References Cited

U.S. PATENT DOCUMENTS 3,955,344 A 5/1976 Sorensen et al.
5,566,537 A 10/1996 Kieffer et al.
5,727,371 A 3/1998 Kieffer et al.

FOREIGN PATENT DOCUMENTS

| DE | 2101876 | 10/1971 |
|---|---|---|
| EP | 0 361 573 | 4/1990 |
| EP | 0 679 327 | 11/1995 |
| FR | 2 394 236 | 1/1979 |
| FR | 2 537 385 | 6/1984 |
| GB | 851711 | 10/1960 |

*Primary Examiner*—Robert E. Pezzuto
(74) *Attorney, Agent, or Firm*—Oblon, Spivak, McClelland, Maier & Neustadt, P.C.

(57) ABSTRACT

An operating device for an agricultural machine which includes a hitching structure connected to a motor vehicle by use of an upper hitching point and at least one lower hitching point. A second lower hitching point is connected to the device and the hitching structure is movable with respect to the second lower hitching point by use of the device. The device thus makes it possible to bring the agricultural machine from a work position into another position or vice versa.

28 Claims, 9 Drawing Sheets

OPERATING DEVICE FOR AN AGRICULTURAL MACHINE

BACKGROUND OF THE INVENTION

1. Field of the Invention

The present invention relates to a device intended in particular to equip an agricultural machine so as to allow the device to be brought from a work position into another position or vice versa, said agricultural machine comprises a hitching structure by means of which it is intended to be hitched to a hitching device of a motor vehicle, said hitching structure comprising an upper hitching point and at least one lower hitching point.

The combination of such a device with an agricultural machine, especially a cutting machine, comprising:
- a hitching structure intended to be hitched to a hitching device of a motor vehicle and comprising an upper hitching point and at least one lower hitching point;
- a cutting mechanism connected directly or indirectly to the hitching structure and intended to assume:
  - at least one work position;
  - at least one transport position, and
  - at least one other intermediate position;
- a first device allowing said cutting mechanism to be brought from a work position into an intermediate position or vice versa;
- a second device allowing said cutting mechanism to be brought into a transport position; and
- a third device intended to lighten the cutting mechanism in the work position, so as to allow the cutting machine to be brought from a work position into another intermediate position or vice versa.

2. Discussion of the Background

An agricultural machine equipped with such a device is known. This agricultural machine is a mower comprising a cutting mechanism connected to a hitching structure by means of a carrying beam. This carrying beam is connected on the one hand to the central part of the cutting mechanism by means of a first articulation with an approximately horizontal longitudinal axis pointing in the direction of forward travel and, on the other hand, to the hitching structure by means of a second articulation of approximately horizontal longitudinal axis.

A lifting device comprising a hydraulic ram allows the cutting mechanism and the carrying beam to be pivoted upward about the second articulation. For this, the hydraulic ram is connected, on the one hand, to the carrying beam and, on the other hand, to the hitching structure, and is intended to communicate with a hydraulic unit of a motor vehicle to which the mower is intended to be connected.

This mower can occupy various positions, including a work position, in which the cutting mechanism rests on the ground, a transport position in which the cutting mechanism extends approximately vertically upward and an intermediate position in which the cutting mechanism extends somewhat above the level of the ground.

To achieve this, the hydraulic ram pivots more or less the cutting mechanism and the carrying beam upward about the second articulation.

The cutting mechanism is driven by means of a transmission device comprising a first telescopic transmission shaft with universal joints which is connected on the one hand to a power take-off of the motor vehicle and on the other hand to a transmission casing of the mower, which casing transmits the movement to the cutting mechanism via a second transmission shaft.

A mower of this kind can swiftly be brought from a work position into an intermediate position or vice versa, and this makes operations at the end of the plot, for example, easier.

Furthermore, when changing into the intermediate position, the hitching structure, to which the transmission casing is connected, retains its initial position, and this allows the first telescopic transmission shaft with universal joints always to operate under acceptable conditions.

However, this mower does have a major drawback. It can be seen that the second articulation, that connects the carrying structure to the hitching structure, is situated in close proximity to the cutting mechanism, and this results in insufficient space between the cutting mechanism and the ground when said cutting mechanism extends in an intermediate position. In this case, there is a risk, during operations at the end of the plot, that the swaths of fodder already formed by the mower may be disturbed. Furthermore, the slightest unevenness of the ground risks causing a collision between the cutting mechanism and said ground, with the risk of damaging the mower.

Finally, an intermediate position, in which the ground clearance of the cutting mechanism is insufficient, not only forces the operator to pay particular attention to the mower during operations at the end of the plot, but also forces him to carry out additional operations in order to avoid damaging said mower.

SUMMARY OF THE INVENTION

The object of the present invention is to overcome the drawbacks of this known mower, while at the same time maintaining a swift change to the intermediate position and good working conditions for the transmission device.

To this end, the device according to the present invention, intended to equip an agricultural machine and allowing it to be brought from a work position into another position or vice versa, said agricultural machine comprising a hitching structure by means of which it is intended to be hitched to a hitching device of a motor vehicle, and said hitching structure for its part comprising an upper hitching point and at least one lower hitching point, is one wherein there is provided a second lower hitching point connected to said device and wherein said hitching structure can be moved with respect to said second lower hitching point by means of said device.

The present invention also relates to a cutting machine comprising:
- a hitching structure intended to be hitched to a hitching device of a motor vehicle and comprising an upper hitching point and at least one lower hitching point;
- a cutting mechanism connected directly or indirectly to the hitching structure and intended to assume:
  - at least one work position;
  - at least one transport position, and
  - at least one other intermediate position;
- a first device allowing said cutting mechanism to be brought from a work position into an intermediate position or vice versa;
- a second device allowing said cutting mechanism to be brought into a transport position;
- a third device intended to lighten the cutting mechanism in the work position.

Such a device, particularly when it is equipping a cutting machine like the one described hereinabove, advantageously allows the hitching structure to be pivoted upward about the lower hitching point belonging to said hitching structure so as to raise the cutting mechanism and bring it from a work position into another intermediate position, or vice versa.

The invention also relates to the following features taken in isolation or in any technically feasible combination:

- the device comprises an operating element allowing the hitching structure to be moved with respect to the second lower hitching point and a holding element allowing the motor vehicle to pull or to push the agricultural machine during work;
- the operating element is connected directly or indirectly to the hitching structure and is connected directly or indirectly to the second lower hitching point;
- the holding element is a draft rod connected on the one hand directly or indirectly to the hitching structure by means of a first articulation the longitudinal axis of which is at least approximately horizontal and transversal to the direction of forward travel;
- the second lower hitching point is connected to the draft rod;
- the operating element comprises an operating ram connected on the one hand to the hitching structure by means of a second articulation and on the other hand to the draft rod by means of a third articulation;
- the device is intended to come from a position other than the work position into the work position under the effect of the weight of the agricultural machine;
- the device additionally comprises a fixed structure intended to be fixed, on the one hand, to the hitching structure and on the other hand supporting the draft rod by means of the first articulation;
- to define the maximum intermediate position corresponding to maximum pivoting of the hitching structure about the lower hitching point belonging to said hitching structure, the position of the second lower hitching point furthest from the hitching structure is limited by means of a stop;
- the third device intended to lighten the cutting mechanism comprises an energy accumulator connected directly or indirectly to the hitching structure and connected directly or indirectly to the cutting mechanism;
- the cutting machine comprises a carrying beam connected on the one hand to the cutting mechanism by means of a fourth articulation and on the other hand directly or indirectly to the hitching structure by means of a fifth articulation and of a sixth articulation;
- the energy accumulator comprises a ram and a pressure accumulator, said ram being connected on the one hand directly or indirectly to the hitching structure and on the other hand being connected to said carrying beam by means of a seventh articulation;
- to increase the ground clearance of the cutting mechanism without thereby further pivoting the hitching structure about the lower hitching point thereof, the first device, allowing the cutting mechanism to be brought from a work position into an intermediate position or vice versa, is combined with the third device intended to lighten the cutting mechanism in the work position;
- the first device allowing the cutting mechanism to be brought from a work position into an intermediate position or vice versa controls the third device intended to lighten said cutting mechanism so as to pivot the hitching structure about the lower hitching point thereof while at the same time pivoting the carrying beam and the cutting mechanism about the fifth articulation;
- the operating ram of the first device is in communication with the ram of the energy accumulator of the third device;
- the operating ram of the first device comprises two chambers, the first chamber being intended to communicate with a hydraulic unit of the motor vehicle and the second chamber being in communication with the single chamber of the ram of the energy accumulator;
- there is provided a first valve intended to allow or to prevent communication between the hydraulic unit of the motor vehicle and the first chamber of the operating ram;
- there is provided a second valve intended to allow or to prevent communication between the hydraulic unit of the motor vehicle and the second chamber of the operating ram, the pressure accumulator and the single chamber of the ram of the energy accumulator, which in particular allows the amount of lightening of the cutting mechanism to be adjusted;
- there is provided a means allowing fluid to pass only toward the first chamber of the operating ram and limiting the flow rate of the fluid between said first chamber and the hydraulic unit of the motor vehicle, this allowing rapid deployment of the operating ram in order to bring the cutting mechanism swiftly into the intermediate position and, by contrast, less swift retraction of said operating ram in order to bring said cutting mechanism into the work position less abruptly;
- the second device allowing said cutting mechanism to be brought into a transport position comprises another ram allowing the cutting mechanism to be pivoted from an intermediate position into a transport position or vice versa about the sixth articulation;
- the other ram of the second device comprises:
  - a first chamber intended to communicate with the hydraulic unit of the motor vehicle; and
  - a second chamber intended to communicate with the hydraulic unit of the motor vehicle via a third valve;
- the third valve comprises or is combined with a second means which, when said third valve is in one position, allows fluid to pass only toward the second chamber of the other ram and prevents outlet therefrom;
- the third device intended to lighten the cutting mechanism comprises an additional ram connected on the one hand directly or indirectly to the hitching structure and on the other hand to the ram of the energy accumulator;
- the additional ram and the ram of the energy accumulator comprise a common ram rod and the body of said additional ram is connected directly or indirectly to the hitching structure;
- the additional ram comprises another single chamber intended to communicate with the hydraulic unit of the motor vehicle and the first chamber of the operating ram;
- the first and second chambers of the operating ram, the single chamber of the energy accumulator, the first and second chambers of the other ram of the second device and, as appropriate, the chamber of the additional ram are set out relative to one another in such a way as to form a system intended to communicate with the hydraulic unit of the motor vehicle by means of a single supply.

BRIEF DESCRIPTION OF THE DRAWINGS

Other objects and features will be understood from the description below with reference to the appended drawings which, by way of non-limiting examples, depict a number of embodiments of the cutting machine equipped with the device according to the invention.

In these drawings.

DESCRIPTION OF THE PREFERRED EMBODIMENT

Figure 1:
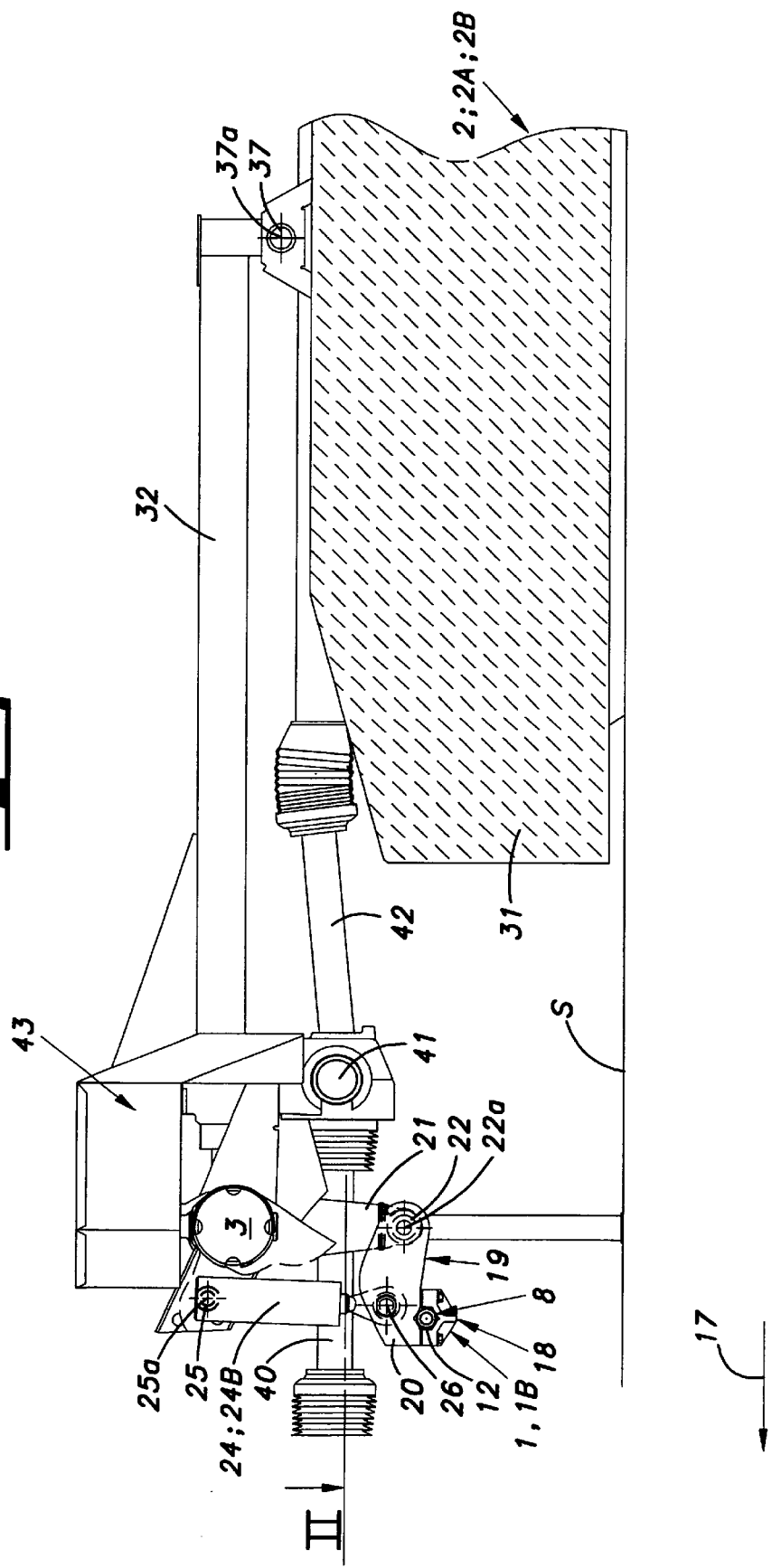
FIG. 1 partially depicts a cutting machine according to the invention, in a side view.

Illustrated FIGS. 1 to 4 is a machine according to the invention which is equipped with a device 1 allowing it to be brought from a work position into another position or vice versa.

According to the embodiment depicted, the cutting machine is a mower 2 comprising a hitching structure 3 connected to a rear hitching device 4 of a motor vehicle 5 (FIGS. 2, 3 and 4) by means of two lower hitching points 7, 8 and an upper hitching point 9.

For this, each lower hitching point 7, 8 comprises a journal 11, 12 to which a corresponding lower hitching arm 13, 14 belonging to the rear hitching device 4 of the motor vehicle 5 is connected. The upper hitching point 9 for its part is connected to an adjustable link 15 which also forms part of the rear hitching device 4. The two lower hitching arms 13, 14 of the rear hitching device 4 of the motor vehicle 5 can be raised, and this among other things allows the hitching structure 3 of the mower 2 to be moved heightwise.

It will be noted that during work, the motor vehicle 5 moves the mower 2 in the direction of forward travel 17.

In the remainder of the description, the following concepts "front" and "rear", "in front of", and "behind" are defined with respect to the direction of forward travel 17, and the concepts "right" and "left" are defined when looking at the mower 2 from behind in the direction of forward travel 17.

It will be observed that the first lower hitching point 7 and the upper hitching point 9 belong to the hitching structure 3, whereas the second lower hitching point 8 forms part of the device 1. It will also be observed that the first lower hitching point 7 is situated to the left of the upper hitching point. 9, whereas the second lower hitching point 8 is situated to the right of said upper hitching point 9.

The hitching structure 3 can also be moved with respect to the second lower hitching point 8 by means of the device 1. For this, the device 1 comprises an operating element 18 connected directly or indirectly to the hitching structure 3 and connected directly or indirectly to the second lower hitching point 8. The device 1 further comprises a holding element 19 in particular allowing the motor vehicle 5 to pull the mower 2 in the direction of forward travel 17 during work. This holding element 19 is, according to the embodiment depicted, a draft rod 20 connected to a fixed structure 21 by means of a first cylindrical articulation 22 the longitudinal axis 22a of which is at least approximately horizontal and orthogonal to the direction of forward travel 17, said fixed structure 21 being fixed to the hitching structure 3.

It will be observed that the journal 12 of the second lower hitching point 8 is fixed to the draft rod 20 and in the position of work is situated in front of the first articulation 22 and approximately the same distance from the ground as the latter.

The operating element 18 comprises an operating ram 24 connected on the one hand to the hitching structure 3 by means of a second cylindrical articulation 25 the longitudinal axis 25a of which is at least approximately horizontal and orthogonal to the direction of forward travel 17 and, on the other hand, to the draft rod 20 by means of a third spherical articulation 26. In the work position, the operating ram 24 extends approximately vertically. For this, the second articulation 25 is situated at the same height as the hitching point 9 of the hitching structure 3, whereas the third articulation 26 is situated below said second articulation 25 and somewhat higher up than the second lower hitching point 8.

Figure 2:
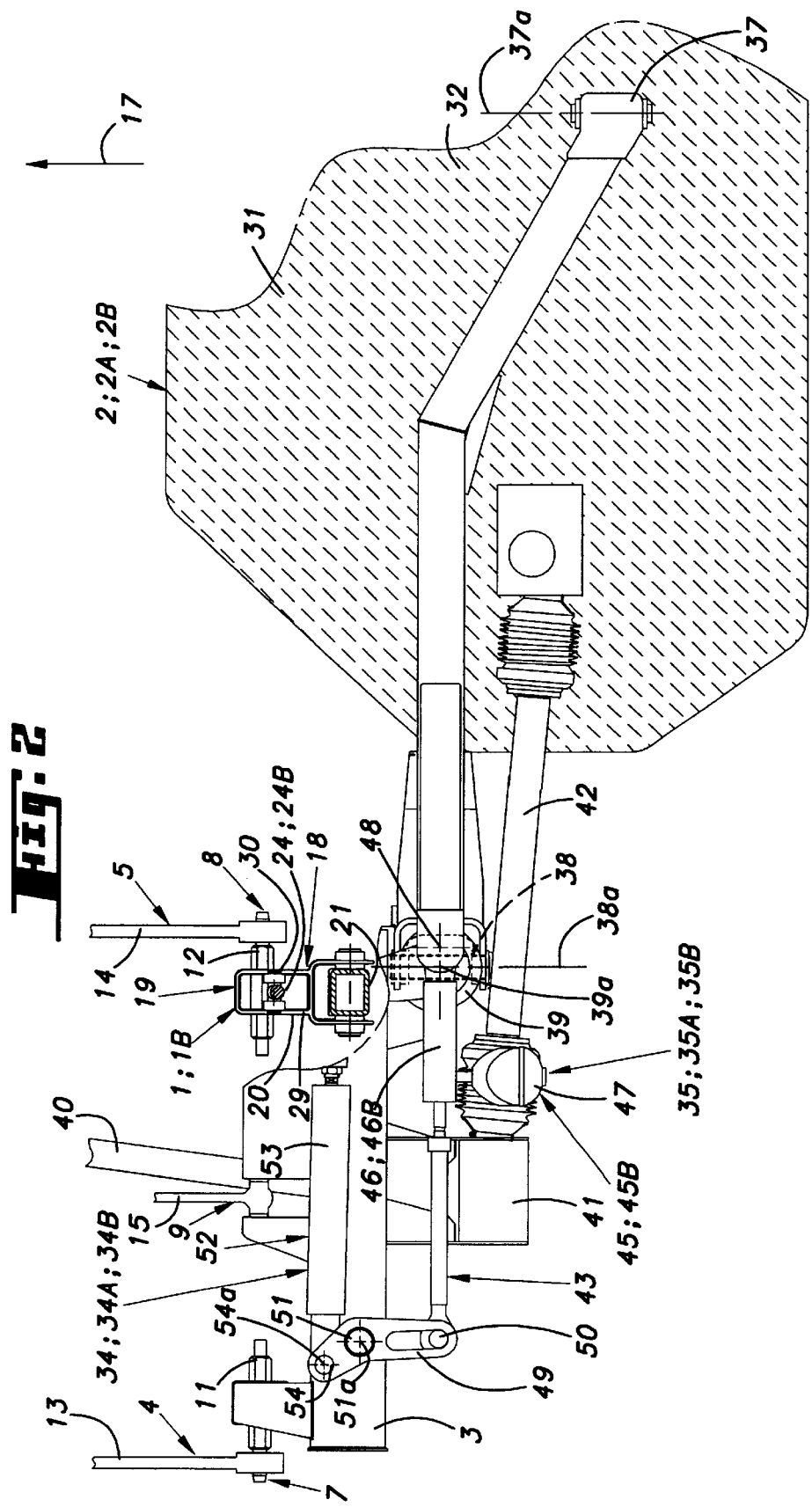
FIG. 2 is a top view in section according to the plane II defined in FIG. 1, without the cover, the cutting machine is connected to a motor vehicle and is in a work position.

In the light of FIG. 2, it can be seen that the draft rod 20, according to the embodiment depicted, is a hollow section comprising two flanges 29, 30 allowing the first articulation 22 and the third articulation 26 to be mounted in the manner of a clevis.

This device 1 allowing the mower 2 to be brought from a work position into another position or vice versa operates as follows.

When the mower 2 is in the work position, the operating ram 24 is supplied with fluid in such a way that it extends. For this, the journal 12 of the second lower hitching point 8 rests on the lower hitching arm 14 of the motor vehicle 5, and this has the effect of moving the hitching structure 3 away from the second lower hitching point 8. During this operation, the hitching structure 3 pivots about the first lower hitching point 7 and at the same time the draft rod 20 pivots about the longitudinal axis 22a of the first articulation 22.

The furthest position of the hitching structure 3 away from the second lower hitching point 8 is limited by a stop which, according to the embodiment depicted, is defined by he maximum length of the operating ram 24.

When the fluid can escape from the operating ram 24, the device 1, more specifically the operating ram 24, returns to its initial position under the effect of the weight of the mower 2.

In the light of FIGS. 1 to 4, it can additionally be seen that the mower 2 also comprises a cutting mechanism 31, a carrying beam 32 and three devices 1, 34, 35. The first device being the device 1 described earlier allowing the hitching structure 3 to be moved with respect to the second lower hitching point 8. The cutting mechanism 31 for its part will not be described in detail: this may in fact be any kind of cutting mechanism.

This cutting mechanism 31 is connected to the hitching structure 3 by means of the carrying beam 32. For this, the carrying beam 32 is connected to the cutting mechanism 31 by means of a fourth cylindrical articulation 37 the longitudinal axis 37a of which is approximately horizontal and points forward when the cutting mechanism 31 is in the normal work position in which it extends at least approximately orthogonally to the direction of forward travel 17.

The carrying beam 32 is also connected to the hitching structure 3 by means of a fifth articulation 38 and of a sixth articulation 29 so that the latter allows the fifth articulation 38 to pivot together with the carrying beam 32 relative to the hitching structure 3.

Figure 3:
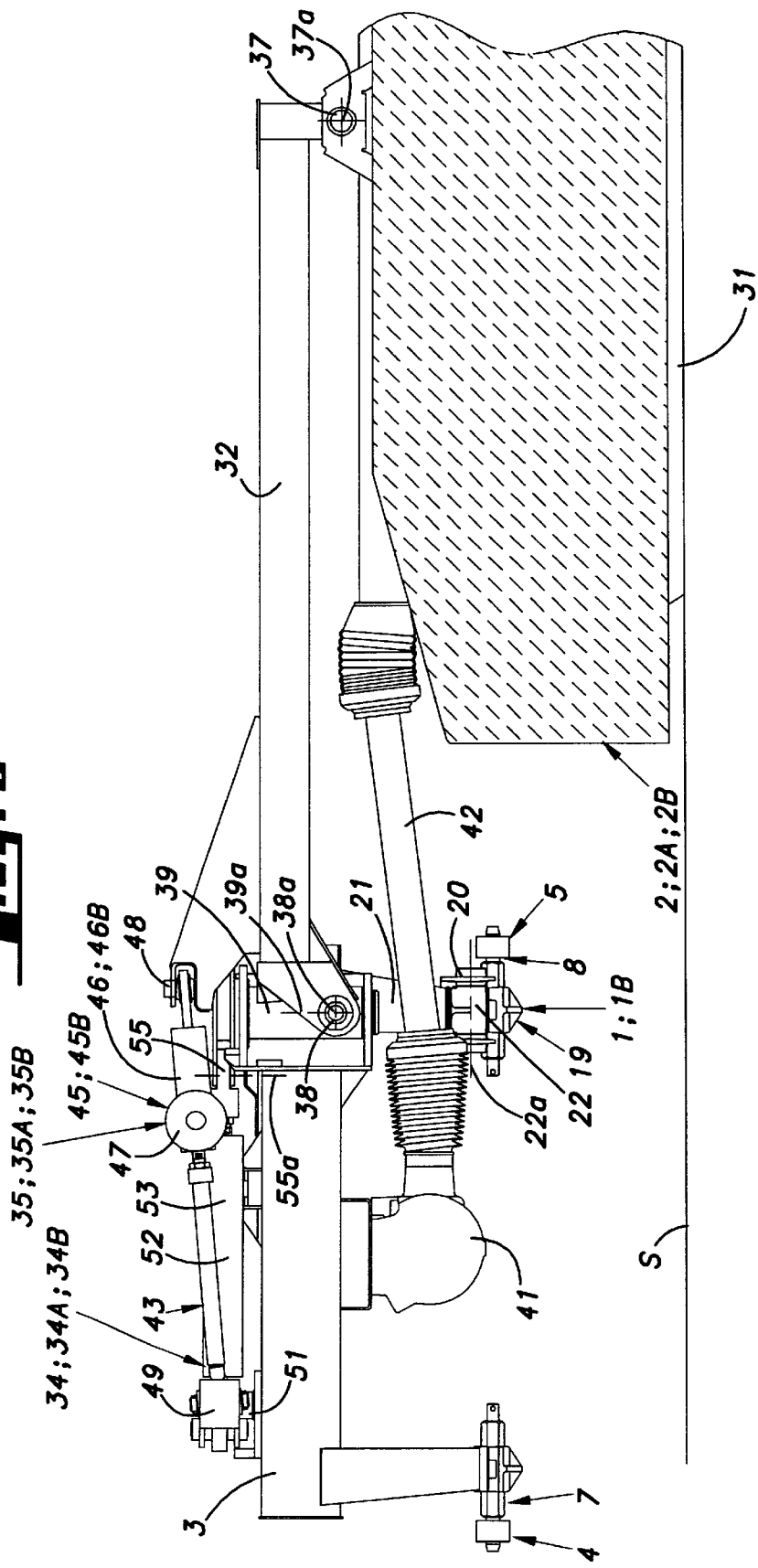
FIG. 3 is a rear view of the cutting machine of FIG. 2.
Figure 4:
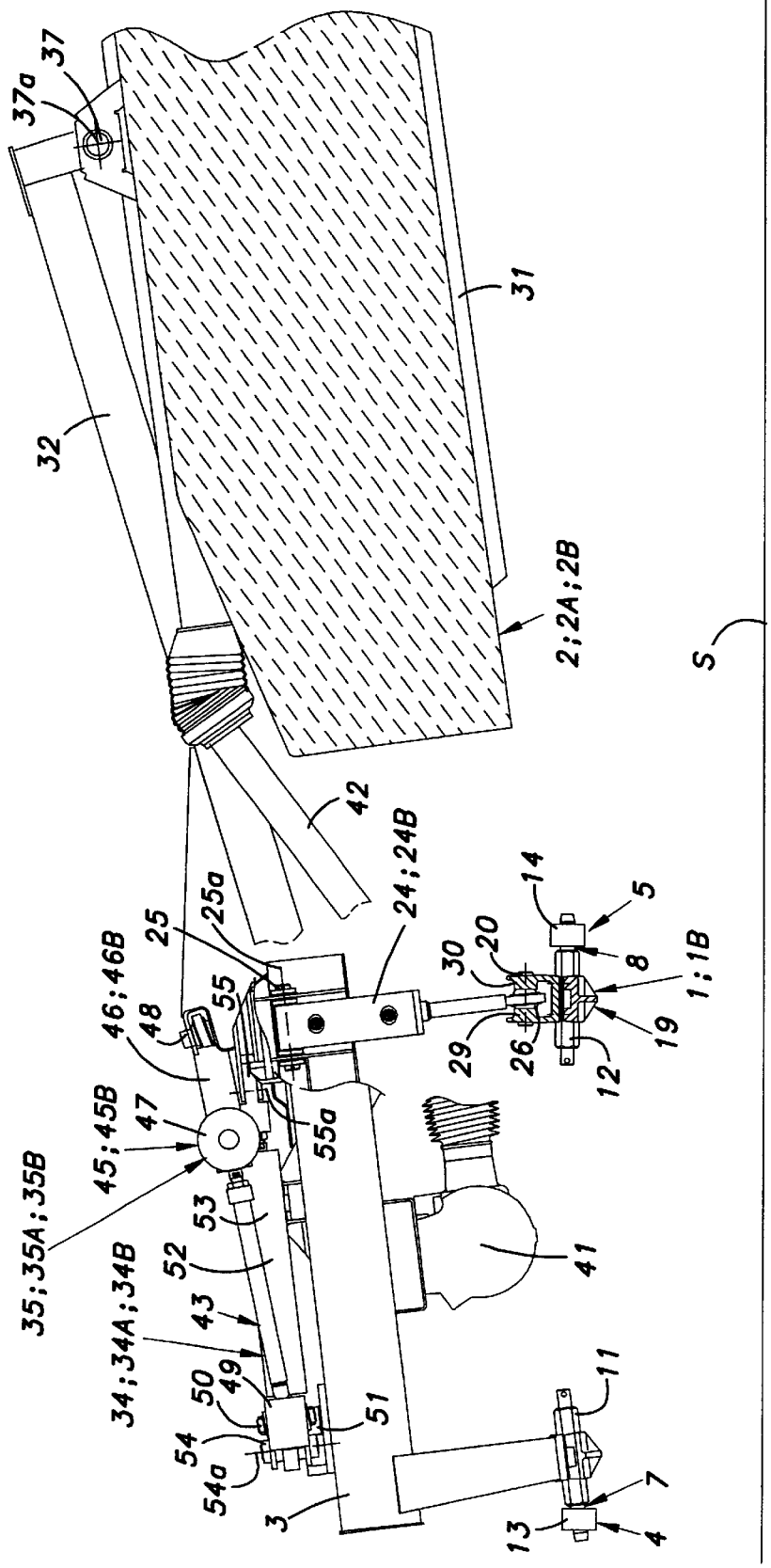
FIG. 4 is a rear view of the cutting machine of FIG. 2 in an intermediate position, and in which a number of part sections have been taken.

This fifth articulation 38 is a cylindrical articulation the axis 38a of which points forward when the cutting mechanism 31 is in the normal work position (in the example depicted, the axis 38a is at least approximately pointing in the direction of work 17). In the light of FIG. 3, it is moreover apparent that the fifth articulation 38 extends at least approximately at the same level with respect to the ground as the fourth articulation 37. The sixth articulation 39 is also a cylindrical articulation, but whose axis 39a points upward (in the example depicted, the axis 39a is at least approximately vertical). It is also apparent that the axis 38a of the fifth articulation 38 and the axis 39a of the sixth articulation 39 are at least approximately secant.

The fourth articulation 37 and this fifth articulation 38 allow the cutting mechanism 31 to follow the relief of the ground during cutting.

The sixth articulation 39 for its part allows the cutting mechanism 31 to pivot backward, especially for transport.

The second device 34 allows said cutting mechanism 31 to be brought from a transport position into a work position or vice versa and the third device 35 allows said cutting mechanism 31 to be lightened in the work position.

The cutting mechanism 31 comprises cutting members (not depicted) driven by a source of motive power which, in the example depicted, consists of the power take-off (not depicted) of the motor vehicle 5. Any other source of motive power is, however, conceivable. The power take-off of the motor vehicle 5 broadly drives a first telescopic transmission shaft 40, a transmission casing 41, a second telescopic transmission shaft 42 which drives the cutting mechanism 31.

The second device 34 allowing the cutting mechanism 31 to be brought from a work position and/or from an intermediate position into a transport position or vice versa as well as the third device 35 allowing said cutting mechanism 31 to be lightened in the work position, form part of a safety device 43. This safety device 43 is similar to the safety device described in document FR 2 719 189 and allows the cutting mechanism 31 to be kept in its normal work position, but allows the latter to pivot together with the carrying beam 32 backward about the axis 38a of the fifth articulation 38 and upward about the axis 39a of the sixth articulation 39 in the case where the cutting mechanism 31 would, during work, collide with an obstacle lying in the field.

For fuller details, reference can be made, if need be, to the text of document FR 2 719 189.

The third device 35 comprises an energy accumulator 45 comprising a ram 46 and a pressure accumulator 47. The ram 46 is connected at one of its ends to the carrying beam 32 by means of a seventh, spherical, articulation 48 and at the other of its ends to a pivoting member 49 by means of an eighth articulation 50 which has been amply described in document. FR 2 719 189. Said pivoting member 49 is itself connected to the hitching structure 3 by means of a ninth, cylindrical, articulation 51, the longitudinal axis 51a of which points upward (in the example depicted, the axis 51a is at least approximately vertical). FIG. 3 shows that the seventh articulation 48 extends approximately above the fifth articulation 38. The force exerted by the energy accumulator 45 thus creates a moment with respect to the axis 38a, which has the effect of reducing the pressure with which the cutting mechanism 31 rests on the ground S. The third device 35 thus fulfils a function of lightening the cutting mechanism 31.

The second device 34 for its part comprises a rod 52 which, according to the embodiment depicted, is another ram 53 connected at one of its ends to the pivoting member 49 by means of a tenth cylindrical articulation 54 the longitudinal axis 54a of which is at least approximately parallel to the longitudinal axis 51a of the ninth articulation 51. At the other of its ends, the other ram 53 is connected to the carrying beam 32 by means of an eleventh articulation 55 the longitudinal axis 55a of which is at least approximately parallel to the longitudinal axis 51a of the ninth articulation 51. It will be observed that this eleventh articulation 55 extends a certain distance from the sixth articulation 39 so that the other ram 53 can act with a certain lever arm with respect to the axis 39a of said sixth articulation 39 on the carrying beam 32.

Figure 5:
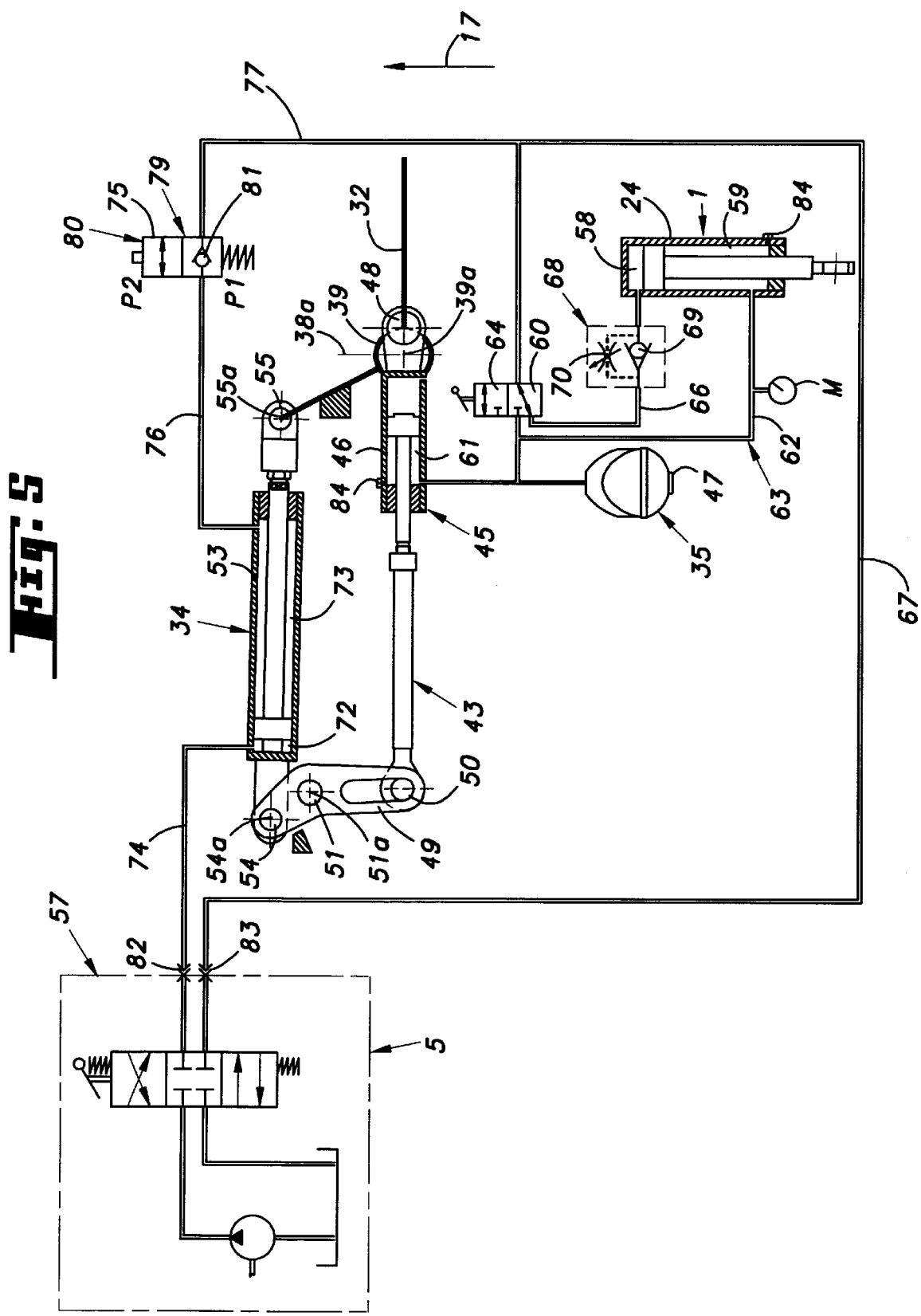
FIG. 5 depicts a diagram of the various devices acting on the cutting mechanism in the work position, according to a first embodiment.
Figure 6:
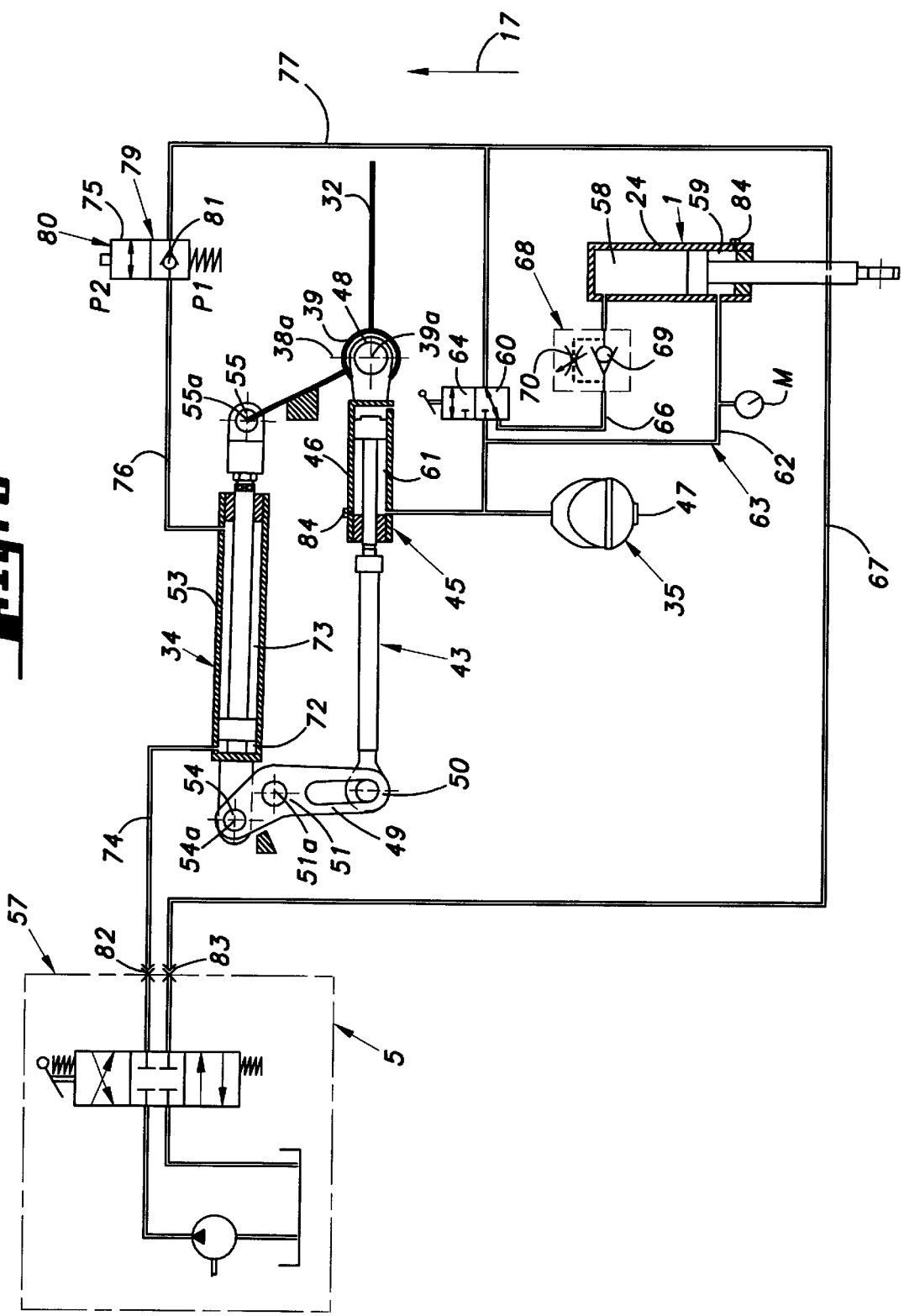
FIG. 6 depicts the diagram of FIG. 5 in the intermediate position.
Figure 7:
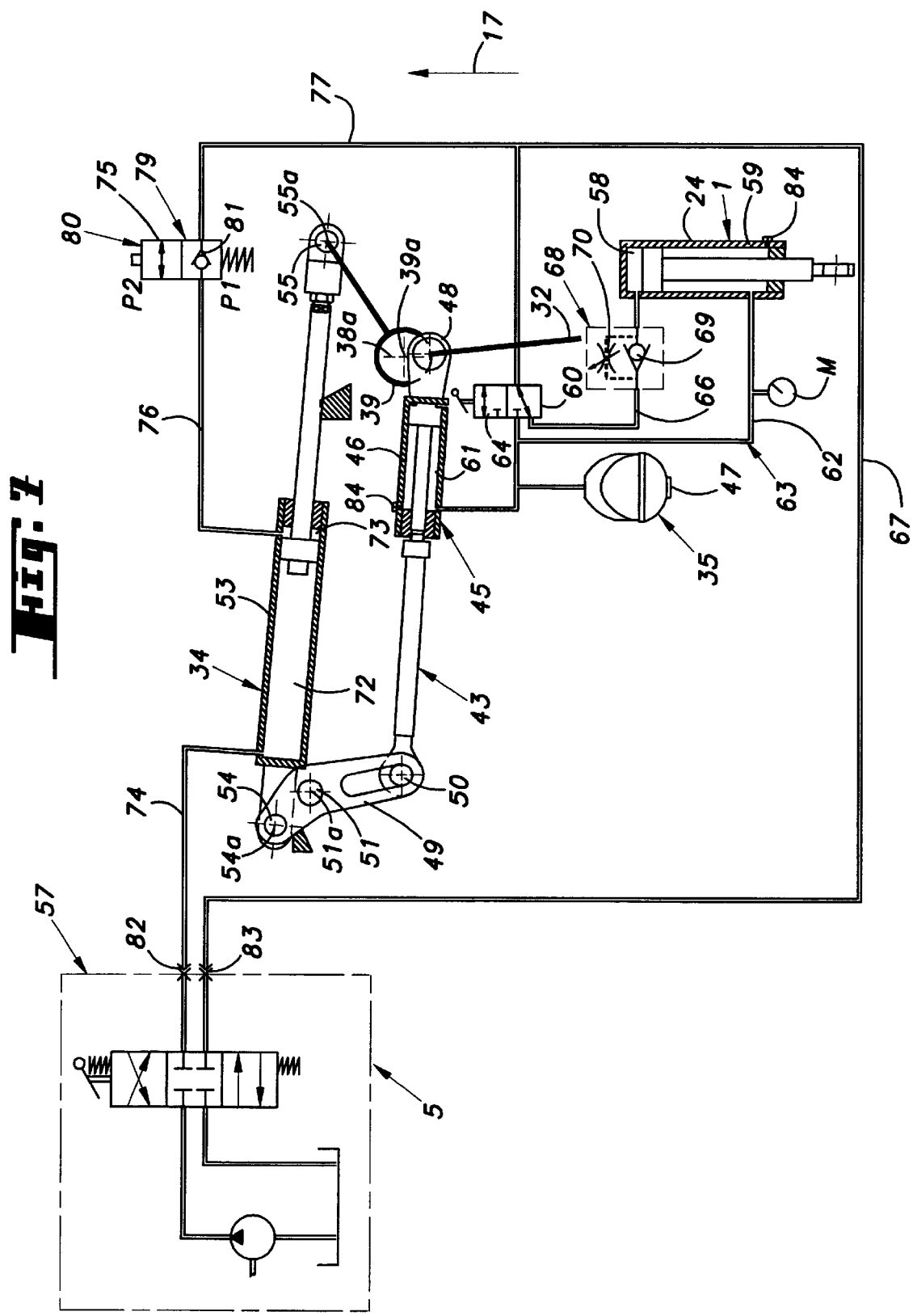
FIG. 7 depicts the diagram of FIG. 5 in the transport position.

FIGS. 5 to 7 diagrammatically depict a first embodiment and layout of the various devices 1, 34, 35 acting on the cutting mechanism 31.

In the light of these figures, it can be seen that the first device 1, allowing the cutting mechanism 31 to be brought from a work position into an intermediate position or vice versa, is combined with the third device 35 allowing said cutting mechanism 31 to be lightened in the work position, more precisely said first device 1 controls said third device 35. For this, the operating ram 24 is in communication with the ram 46 of the energy accumulator 45 of the third device 35 and with a hydraulic unit 57 of the motor vehicle 5. For this, the operating ram 24 comprises two chambers 58, 59, the first chamber 58 (the larger one) is intended to communicate with the hydraulic unit 57 of the motor vehicle 5 via a first valve 60, while the second chamber 59 is in communication with the single chamber 61 of the ram 46 of the energy accumulator 45. It will be noted that the single chamber 61 of the ram 46, the second chamber 59 of the operating ram 24 and the pressure accumulator 47 of the energy accumulator 45 communicate with one another by means of a first pipe 62 so as to form a closed circuit 63. It will also be observed that this closed circuit 63 can communicate with the central unit 57 of the motor vehicle 5 via a second valve 64 which allows or which forbids said communication between said closed circuit 63 and the hydraulic unit 57.

It will be noted that the first chamber 58 of the operating ram 24 is in communication with the first valve 60 by means of a second pipe 66 and said first valve 60 is in communication with the hydraulic unit 57 by means of a third pipe 67.

The first valve 60 for its part is intended to allow or to prevent communication between the hydraulic unit 57 of the motor vehicle 5 and the first chamber 58 of the operating ram 24.

It will also be observed that, according to the embodiment depicted, the first and second valves 60, 64 are set out one with respect to the other in such a way as to form a distributor allowing communication between the hydraulic unit 57 of the motor vehicle 5 and either the first chamber 58 of the operating ram 24 or alternatively the closed circuit 63.

Also provided is a means 68 allowing fluid to pass only toward the first chamber 58 of the operating ram 24 and limiting the flow rate of fluid between said first chamber 58 and the hydraulic unit 57 of the motor vehicle 5. This means 68 allows the operating ram 24 to lengthen relatively swiftly but to shorten at a slower rate. For this, according to the embodiment depicted, the means 68 comprises, on the one hand, a non-return valve 69 allowing fluid from the hydraulic unit 57 to pass toward the first chamber 58 and preventing fluid from passing in the opposite direction and, on the other hand, an adjustable restriction 70 through which the fluid is forced to pass as the operating ram 24 shortens, said adjustable restriction 70 being connected in parallel with said non-return valve 69.

In the light of FIGS. 5 to 7, it can additionally be seen that the other ram 53 of the second device 34 is a double-acting ram and for this purpose comprises two chambers 72, 73. The first chamber 72 (the larger one) is intended to communicate with the hydraulic unit 57 of the motor vehicle 5 by means of a fourth pipe 74, while the second chamber 73 is intended to communicate with the hydraulic unit 57 of the motor vehicle 5 via a third valve 75. For this, a fifth pipe 76 is provided, connecting the second chamber 73 to the third valve 75, and a sixth pipe 77 is provided, connecting said third valve 75 to the third pipe 67 which is in communication with the hydraulic unit 57 of the motor vehicle 5.

The third valve 75 comprises a second means 79 on the one hand allowing fluid to pass only toward the second chamber 73 of the other ram 53 and preventing said fluid from leaving said second chamber 73 and, on the other hand, in another configuration, allowing the fluid to pass freely irrespective of the direction of the flow. For this, according to the embodiment depicted, the third valve 75 is a distributor 80 with two positions P1, P2, the position P1 being the one which allows the fluid to pass only toward the second chamber 73, and the position P2 being the one which allows the fluid to pass in both directions. To achieve this, the second means 79 comprises a second non-return valve 81 which is active when the distributor 80 occupies the position P1 and which allows the fluid from the hydraulic unit 57 to pass toward the second chamber 73 of the other ram 53 and prevents fluid from passing in the opposite direction. This distributor 80 is intended to be controlled remotely by the operator. When the operator does not act on the distributor 80, the latter lies in the position P1 described hereinabove.

Such a valve 75, equipped with a non-return valve 81 of this kind makes it possible, according to this embodiment depicted, for the circuit comprising the sixth pipe 77, the third pipe 67 and the second pipe 66 and the operating ram 24 to be protected from any overpressure during the backward and upward pivoting of the cutting mechanism 31 when it runs into an obstacle.

Finally, in the light of FIGS. 5 to 7, it can be seen that the various chambers 58, 59, 61, 72, 73, the various rams 24, 46, 53, the various valves 60, 64, 75, the pressure accumulator 47, the non-return valve 69, the adjustable restriction 70 and the various pipes 62, 66, 67, 74, 76, 77 are laid out relative to one another in such a way as to form a system intended to be connected to the hydraulic unit 57 of the motor vehicle 5 by means of two connectors 82, 83.

According to the embodiment depicted, the connector 82 lies at one of the ends of the fourth pipe 74, while the connector 83 lies at one of the ends of the third pipe 67. Depending on the status of the hydraulic unit 57, two scenarios may arise, the first of these scenarios being one in which the aforementioned supply to the system is via the fourth pipe 74 and return is via the third pipe 67, and the second of these scenarios being where the supply is via the third pipe 67 with return via the fourth pipe 74.

In both scenarios, the system can be supplied by means of just one supply at a time.

It will also be noted that the closed circuit 63 comprises bleed screws 84 intended, when the mower 2 is brought into service, to allow air to be discharged from said closed circuit 63.

This mower 2 depicted in FIGS. 1 to 7, operates as follows.

The mower 2 is connected to the motor vehicle 5 as described earlier.

In the transport position, the cutting mechanism 31 extends above the ground S and approximately behind the hitching structure 3.

To bring the mower 2 from the transport position into the intermediate position in which the cutting mechanism 31 extends above the mown product or product to be mown, the operator, by means of the hydraulic unit 57 of the motor vehicle 5, supplies the first chamber 58 of the operating ram 24 and the second chamber 73 of the other ram 53. For this, fluid from the hydraulic unit 57 passes in turn through the third pipe 67, the first valve 60, the second pipe 66 and the non-return valve 69 to reach the first is chamber 58 of the operating ram 24. At the same time, having travelled down part of the third pipe 67, some of the fluid is forked off, passing in turn through the sixth pipe 77, the second non-return valve 81 and the fifth pipe 76 to reach the second chamber 73 of the other ram 53. For this, the operating ram 24 lengthens, and this makes the hitching structure 3 pivot upward about the first lower hitching point 7, while the other ram 53 shortens, and this makes the carrying beam 32 and the cutting mechanism 31 pivot forward about the longitudinal axis 39a of the sixth articulation 39 until said cutting mechanism 31 lies in an intermediate position.

It will be observed that, when changing to the intermediate position, when the operating ram 24 lengthens, the fluid in the second chamber 59 of said operating ram 24 is driven out into the rest of the closed circuit 63, and this has the effect of increasing the pressure in said closed circuit 63. For this, the ram 46 of the energy accumulator 45 shortens, and this has the effect of making the carrying beam 32 and the cutting mechanism 31 pivot upward about the axis 38a of the fifth articulation 38, thus, in the transport position, making it possible further to increase the ground clearance of said cutting mechanism 31.

In order subsequently to bring the mower 2 from the intermediate position into the work position, the operator allows the fluid contained in the first chamber 58 of the operating ram 24 to escape therefrom in full or in part. For this, the fluid contained in the first chamber 58 passes in turn through the adjustable restriction 70, the second pipe 66, the first valve 60 and the third pipe 67 to reach the hydraulic unit 57. During this change to the work position, the operating ram 24 shortens, and this causes the hitching structure 3, the carrying beam 32 and the cutting mechanism 31 to pivot about the first lower hitching point 7 until said cutting mechanism 31 is resting on the ground S. At the same time, when the operating ram 24 shortens, the volume of the closed circuit 63 increases, which causes the pressure therein to drop until the initial pressure corresponding to the desired lightening of the cutting mechanism is reached. For this, the carrying beam 32 and the cutting mechanism 31 pivot somewhat downward about the axis 38a of the fifth articulation 38 until said cutting mechanism 31 is resting on the ground S. The mower 2 is in the work position.

To vary the amount of lightening of the cutting mechanism 31, all that is required is for the pressure in the closed circuit 63 to be varied. Thus, to increase the amount of lightening of the cutting mechanism 31, the pressure in the closed circuit 63 needs to be increased, and conversely, to decrease the amount of lightening, said pressure needs to be reduced.

To achieve this, in the work position, for example, when the operator wishes to increase the amount of lightening, he first activates the second valve 64, and secondly, using the hydraulic unit 57 feeds fluid into the closed circuit 63 in order to increase the pressure therein. For this, fluid from the hydraulic unit 57 passes in turn through the third pipe 67, the second valve 64 to reach the closed circuit 63. Conversely, when the operator wishes to decrease the amount of lightening, he simply activates the second valve 64 and the hydraulic unit 57 so as to allow some of the fluid contained in the closed circuit 63 to escape to said hydraulic unit 57 in order to drop the pressure therein. As soon as the desired pressure in the closed circuit 63, in this case the desired lightening of the cutting mechanism 31 is reached, the operator stops activating the second valve 64 and/or the hydraulic unit 57. To monitor the pressure in the closed circuit 63 there is a pressure gage M connected in parallel with said closed circuit 63. It will also be observed that the first valve 60 and the second valve 64 can never be activated at the same time, namely that by activating one the other is automatically deactivated.

At the end of the plot, during operations for example, the operator brings the mower 2 from the work position into the intermediate position. To achieve this, the operator feeds the first chamber 58 of the operating ram 24 and the second chamber 73 of the other ram 53, by means of the hydraulic unit 57 of the motor vehicle 5. For this, the operating ram 24 lengthens, causing the ram 46 of the energy accumulator 45 to shorten. This change to the intermediate position from the work position will not be described further in detail. For more complete information reference may be made to the description for changing to the intermediate position from the transport position as described earlier. It will, however, be noted that the other ram 53 is, in the work position, just like in the intermediate position, at the end of its travel and is shortened as far as possible and therefore will remain motionless when its second chamber 73 is supplied.

To bring the mower 2 from the work position into the transport position, the operator first of all brings said mower 2 into the intermediate position as described hereinabove.

Next, the operator places the distributor 80 in the position P2 so as to allow fluid to pass freely between the fifth and sixth pipes 76, 77.

The operator then feeds the first chamber 72 of the other ram 53 via the fourth pipe 74 and at the same time allows fluid to return through the third pipe 67 by means of the hydraulic unit 57.

The fluid in the second chamber 73 of the other ram 53 escapes, passing in turn through the fifth pipe 76, the distributor 80 (in the position P2), the sixth pipe 77 and said third pipe 67 in order to reach said hydraulic unit 57.

For this, the other ram 53 lengthens, causing the carrying beam 32 and the cutting mechanism 31 to pivot backward about the longitudinal axis 39*a* of the sixth articulation 39 until the cutting mechanism 31 is in the transport position. At approximately the same time, the operating ram 24 shortens, which causes the hitching structure 3 to pivot downward about the first lower hitching point 7. The fluid of the first chamber 58 of the operating ram 24 for its part passes in turn through the adjustable restriction 70, the second pipe 66, the first valve 60 before joining the fluid coming from the second chamber 73 of the other ram 53 in the third pipe 67.

Figure 8:
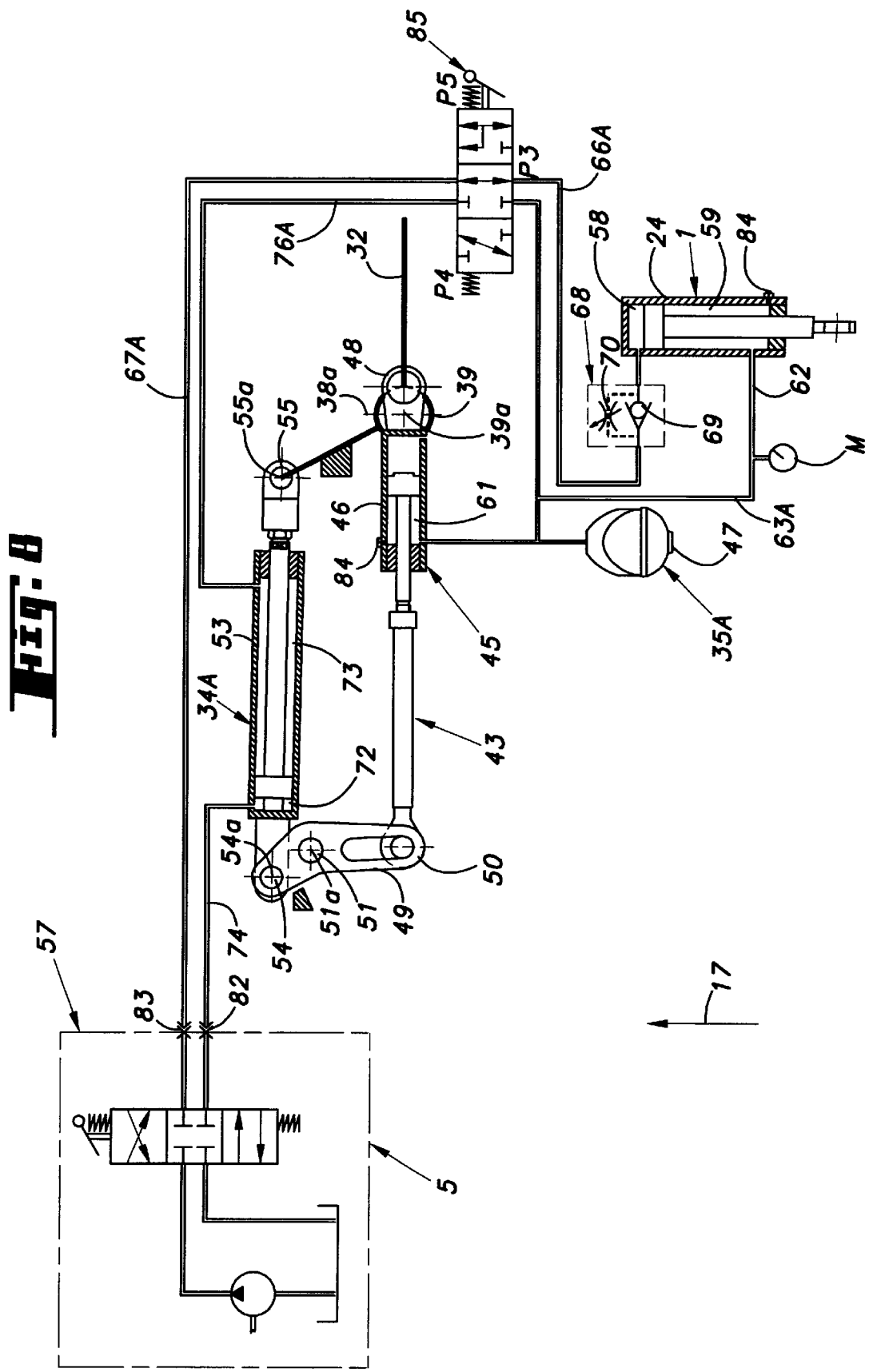
FIG. 8 depicts a diagram of the various devices in the work position according to a second embodiment.

FIG. 8 depicts a second embodiment and layout of the various devices 1; 34A; 35A acting on the cutting mechanism 31. These various devices 1; 34A; 35A comprise a certain number of elements which have been described before. These elements will therefore keep the same reference number and will not be redescribed. They also comprise a certain number of elements which are comparable with elements of the devices 1, 34, 35 followed by the letter A. They will be described only if this proves necessary.

The second embodiment and layout of the various devices 1; 34A; 35A depicted in FIG. 8 differs from the first embodiment in that the first valve 60, the second valve 64 and the third valve 75 form a single distributor 85 with three positions P3, P4, P5.

This single distributor 85 makes it possible to act either on the first device 1 or on the second device 34A or alternatively on the third device 35A. For this, the position P3 of the single distributor 85 allows the first chamber 58 of the operating ram 24 to be supplied with fluid from the hydraulic unit 57 of the motor vehicle 5 or allows fluid to escape toward said hydraulic unit 57, depending on the latter's status.

The position P4 of the single distributor 85 allows the closed circuit 63 to be supplied with fluid or allows fluid to escape therefrom in order to adjust the amount of lightening of the cutting mechanism 31.

The position P5 of the single distributor 85 allows either the first chamber 58 of the operating ram 24 and the second chamber 73 of the other ram 53 to be supplied with fluid, or allows fluid to escape from said chambers 58, 73.

It will be noted that this single distributor 85 is intended to be controlled by the operator and that in the neutral position (when the operator is not acting on the single distributor 85) this distributor lies in the position P3 described hereinabove.

This second embodiment with a single distributor 85 allows the operator's tasks to be simplified in particular.

Figure 9:
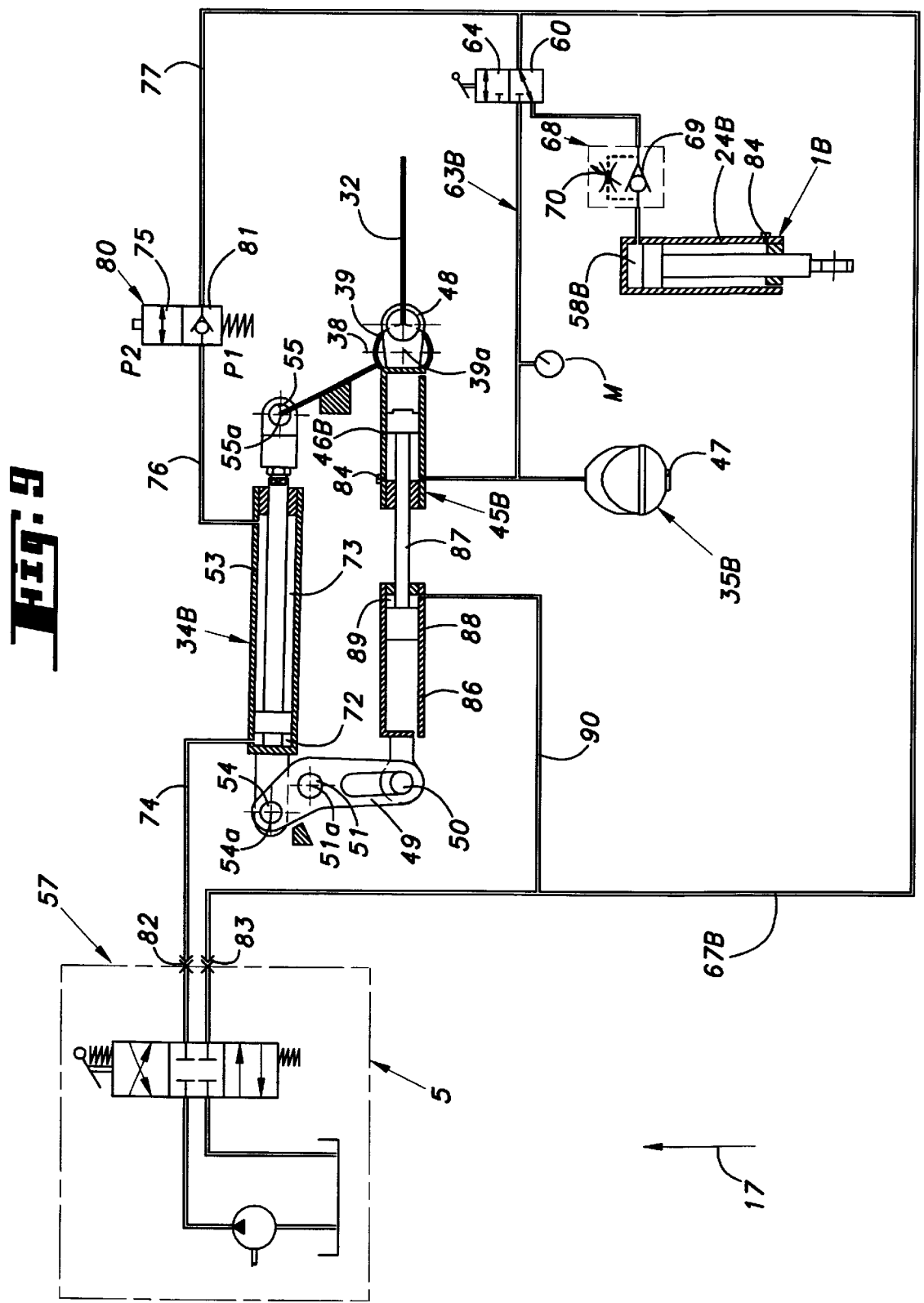
FIG. 9 depicts a diagram of the various devices in the work position according to a third embodiment.

FIG. 9 depicts a third embodiment and layout of the various devices 1; 34B; 35B acting on the cutting mechanism 31. These various devices 1; 34B; 35B comprise a certain number of elements which have been described previously. These elements will therefore keep the same reference number and will not be redescribed. They also comprise a certain number of elements which are comparable with elements of the devices 1, 34, 35 followed by the letter B. They will be described only if this proves necessary.

The third embodiment and layout of the various devices 1; 34B; 35B depicted in FIG. 9 differs from the first embodiment in that the operating ram 24B is a single-acting ram comprising only a first chamber 58B and that the third device 35B comprises an additional ram 86. This additional ram 86 is connected at one of its ends to the ram 46B of the energy accumulator 45B and at the other of its ends to the pivoting member 49. More specifically, the additional ram 86 and the ram 46B comprise a common ram rod 87 and the body 88 of said additional ram 86 is connected to the pivoting member 49.

It will be observed that the additional ram 86 is a single-acting ram comprising another single chamber 89 which can communicate with the hydraulic unit 57 of the motor vehicle 5 and the first chamber 58B of the operating ram 24B by means of a seventh pipe 90 which communicates with the third pipe 67B.

When the mower 2 is brought into the intermediate position, the additional ram 86 shortens, and this has the effect of lengthening the ram 46B of the energy accumulator 45B until said ram 46B reaches the end of its travel or the pressure in the closed circuit 63B is high enough so that when the additional ram 86 continues to shorten, the carrying beam 32 and the cutting mechanism 31 pivot upward about the axis 38*a* of the fifth articulation 38.

It will be observed that this third embodiment advantageously allows the carrying beam 32 and the cutting mechanism 31 to pivot about the axis 38a of the fifth articulation 38 without being dependent on the operating ram 24B.

Various modifications may be made to the embodiments just described, particularly as regards the construction of the various elements or by substituting technical equivalents, without in any way departing from the field of protection.

Thus, for example, it is possible to combine the operating ram 24; 24B with the additional energy accumulator 45; 45B so that said operating ram 24; 24B plays a part in lightening the cutting mechanism 31.

It is also perfectly possible for the journal 12 of the second lower hitching point 8 to be sited higher up than the first articulation 22 connecting the draft rod 20 to the fixed structure 21. Such an embodiment would make it possible to create an upward vertical force on the fixed structure 21, which force would play a part in lightening the cutting mechanism 31 during work.

Finally, it is of course perfectly possible to equip the mower 2 or another agricultural machine with the operating device 1; 1B without combining it with a lightening device. For this, the first chamber 58; 58B of the operating ram 24: 24B could communicate only with the hydraulic unit 57 of the motor vehicle 5 via the means 68.

What is claimed as new and desired to be secured by Letters Patent of the United States is:

1. A device for an agricultural machine for allowing the machine to be brought from a work position, in which said agricultural machine rests at least partially on the ground, into another position in which said agricultural machine extends above the ground or vice versa, which comprises:
   a hitching structure for being to a hitching device of a motor vehicle, said hitching structure comprising an upper hitching point, a first lower hitching point, a second lower hitching point connected to said device, and operating an element, wherein the operating element comprises an operating ram for moving the hitching structure with respect to said second lower hitching point.

2. Device as claimed in claim 1, which comprises a holding element allowing the motor vehicle to pull or to push the agricultural machine during work.

3. Device as claimed in claim 1, wherein the operating element is connected to the hitching structure and is connected to the second lower hitching point.

4. Device as claimed in claim 2, wherein the holding element comprises a draft rod connected to the hitching structure by means of a first articulation, a longitudinal axis of which is at least approximately horizontal and transversal to the direction of forward travel.

5. Device as claimed in claim 4, wherein the second lower hitching point is connected to the draft rod.

6. Device as claimed in claim 4, wherein the operating ram is connectable to the hitching structure by a second articulation and to the draft rod by a third articulation.

7. Device as claimed in claim 1, wherein said machine is moveable from a position other than the work position into the work position under the effect of the weight of the agricultural machine.

8. Device as claimed in claim 4, which comprises a fixed structure which is fixed to the hitching structure and supports the draft rod via the first articulation.

9. Device as claimed in claim 1, which comprises a stop member, wherein the position of the second lower hitching point furthest from the hitching structure is limited said stop member.

10. Agricultural machine comprising:
    a hitching structure for being hitched to a hitching device of a motor vehicle and comprising an upper hitching point, a first lower hitching point, a second lower hitching point, and an operating element; and
    a device allowing said agricultural machine to be brought from a work position in which said agricultural machine rests at least partially on the ground, into a position in which said agricultural machine extends above the ground or vice versa,
    wherein the operating element comprises an operating ram allowing the hitching structure to be moved with respect to said second lower hitching point.

11. Cutting machine comprising:
    a hitching structure for being hitched to a hitching device of a motor vehicle and comprising an upper hitching point, a first lower hitching point and a second lower hitching point;
    a cutting mechanism connected to the hitching structure and being positionable in:
        at least one work position in which said cutting mechanism rests on the ground;
        at least one transport position, and
        at least one other intermediate position in which said cutting mechanism extends above the ground;
    a first device allowing said cutting mechanism to be moved from a work position into an intermediate position or vice versa and comprising an operating element;
    a second device allowing said cutting mechanism to be brought into said at least one transport position; and
    a third device for lightening the cutting mechanism in the work position,
    wherein the operating element comprises an operating ram for moving the hitching structure with respect to said second lower hitching point.

12. Cutting machine as claimed in claim 11, wherein the third device for lightening the cutting mechanism comprises an energy accumulator connected to the hitching structure and connected to the cutting mechanism.

13. Cutting machine as claimed in claim 11, which comprises a carrying beam which is connectable to the cutting mechanism by a fourth articulation and is connectable to the hitching structure by a fifth articulation and a sixth articulation.

14. Cutting machine as claimed in claim 12, which comprises a carrying beam which is connectable to the cutting mechanism by a fourth articulation and connectable to the hitching structure by a fifth articulation and a sixth articulation, wherein the energy accumulator comprises a ram and a pressure accumulator, said ram being connectable to the hitching structure and being connectable to said carrying beam by means of a seventh articulation.

15. Cutting machine as claimed in claim 11, wherein the first device, is combinable with the third device for lightening the cutting mechanism in the work position.

16. Cutting machine as claimed in claim 15, wherein the first device allowing the cutting mechanism to be brought from a work position into an intermediate position or vice versa controls the third device for lightening said cutting mechanism.

17. Cutting machine as claimed in claim 14, wherein the operating element comprises an operating ram which is in communication with the ram of the energy accumulator of the third device.

18. Cutting machine as claimed in claim 17, wherein the operating ram of the first device comprises two chambers, the first chamber communicating with a hydraulic unit of the motor vehicle and the second chamber communicating with a single chamber of the ram of the energy accumulator.

19. Cutting machine as claimed in claim 18, which comprises a first valve to allow or prevent communication between the hydraulic unit of the motor vehicle and the first chamber of the operating ram.

20. Cutting machine as claimed in claim 18, which comprises a second valve for allowing or preventing communication between the hydraulic unit of the motor vehicle and the second chamber of the operating ram, the pressure accumulator and the single chamber of the ram of the energy accumulator.

21. Cutting machine as claimed in claim 18, which comprises a mechanism allowing fluid to pass only toward the first chamber of the operating ram and limiting a flow rate of the fluid between said first chamber and the hydraulic unit of the motor vehicle.

22. Cutting machine as claimed in claim 13, wherein the second device allowing said cutting mechanism to be brought into a transport position comprises an additional ram allowing said cutting mechanism to be pivoted from an intermediate position into a transport position or vice versa about the sixth articulation.

23. Cutting machine as claimed in claim 22, wherein the other ram of the second device comprises:

a first chamber intended to communicate with a hydraulic unit of the motor vehicle; and a second chamber intended to communicate with the hydraulic unit of the motor vehicle via a third valve.

24. Cutting machine as claimed in claim 23, wherein the third valve comprises a second mechanism or is combinable with said second mechanism such that, in one position of said third valve, fluid is allowed to pass only toward the second chamber of the other ram and prevents outlet of the fluid therefrom.

25. Cutting machine as claimed in claim 12, wherein the energy accumulator comprises a ram and wherein the third device for lightening the cutting mechanism comprises an additional ram which is connectable to the hitching structure or is connectable to said ram of said energy accumulator.

26. Cutting machine as claimed in claim 25, wherein the additional ram and the ram of the energy accumulator comprise a common ram rod and wherein said additional ram additionally comprises a body connected to the hitching structure.

27. Cutting machine as claimed in claim 25, wherein the operating element comprises an operating ram which comprises a first chamber and a second chamber, said additional ram comprising an additional single chamber for communicating with a hydraulic unit of the motor vehicle and said first chamber.

28. Cutting machine as claimed in claim 18, wherein:

the second device comprises another ram having a first chamber and a second chamber;

the third device comprises an additional ram having another single chamber, the first and second chambers of the operating ram, the single chamber of the ram of the energy accumulator, said first and said second chambers of the other ram and, as appropriate, said chamber of said additional ram are set out relative to one another in such a way as to form a system for communicating with the hydraulic unit of the motor vehicle by means of a single supply.

* * * * *